United States Patent
Pao et al.

(10) Patent No.: US 7,125,141 B2
(45) Date of Patent: Oct. 24, 2006

(54) APPARATUS FOR HOMOGENEOUSLY DISTRIBUTING LIGHTS

(75) Inventors: Yu-Nan Pao, Hsinchu (TW); Yu-Cheng Lin, Hsinchu (TW); Tsung-Hsin Lin, Hsinchu (TW); Kuen-Lung Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/782,845

(22) Filed: Feb. 23, 2004

(65) Prior Publication Data

US 2005/0128745 A1 Jun. 16, 2005

(30) Foreign Application Priority Data

Dec. 12, 2003 (TW) .............................. 92135133 A (51) Int. Cl.
*F21V 5/00* (2006.01)

(52) U.S. Cl. ................ 362/225; 362/330; 362/329; 362/339; 362/224

(58) Field of Classification Search ................ 362/235, 362/249, 327, 328, 329, 330, 331, 332, 339, 362/225, 217, 223, 224, 29, 237, 240, 244
See application file for complete search history.

(56) References Cited

U.S. PATENT DOCUMENTS

| | | | | |
|---|---|---|---|---|
| 4,111,561 | A | * | 9/1978 | Plummer ..................... 356/225 |
| 4,823,246 | A | * | 4/1989 | Dilouya ...................... 362/328 |
| 5,381,309 | A | * | 1/1995 | Borchardt ................... 362/612 |
| 6,100,952 | A | * | 8/2000 | Marvin et al. ................ 349/62 |
| 6,280,063 | B1 | | 8/2001 | Fong |
| 6,292,295 | B1 | * | 9/2001 | Yamashita et al. .......... 359/460 |
| 6,561,663 | B1 | * | 5/2003 | Adachi et al. .............. 362/616 |
| 2002/0001055 | A1 | | 1/2002 | Kimura |
| 2003/0223249 | A1 | * | 12/2003 | Lee et al. .................... 362/561 |

* cited by examiner

*Primary Examiner*—Thomas M. Sember
(74) *Attorney, Agent, or Firm*—Rabin & Berdo, P.C.

(57) ABSTRACT

An apparatus for homogeneously distributing lights includes a light guide plate, an incidence microstructure and an emergence microstructure. The incidence microstructure is arranged on a surface of the light guide plate and opposite to a light source. The emergence microstructure is arranged on a surface of the light guide plate opposite to the incidence microstructure. The lights emitted by the light source pass through said apparatus thereby being homogenously distributed. Thus the manufacture costs are lowered, and the light source utilization ratio is increased.

11 Claims, 6 Drawing Sheets

APPARATUS FOR HOMOGENEOUSLY DISTRIBUTING LIGHTS

BACKGROUND OF THE INVENTION

1. Field of the Invention

The present invention relates generally to an apparatus for homogeneously distributing lights, and more particularly, to an apparatus for homogeneously distributing lights applied to a direct type backlight module.

2. Description of the Related Art

Large-scale liquid crystal display (LCD) is mainly applied to a notebook computer or an LCD monitor. Liquid crystal material does not emit light itself. Therefore an external light source is needed for displaying images. Because of a trend of light, thin, short and small styles of a light source of a backlight module, and a requirement for being applied to a large-scale panel, such as an LCD television (TV), the backlight module is not only supposed to have the above-mentioned advantages, but also have other advantages, such as high display luminance, broad visual angle, distinct image contrast and long life. Therefore, direct type backlight module, which is designed for solving the limitations of low luminance in lateral sides thereof and unhomogeneously distribution of the lights, when used in large-scale panels, takes full advantage of its high display luminance to apply direct type linear light source for homogeneously distributing the lights; converts the homogeneous lights into area lights; and imports the area lights to the illumination area.

General light source of direct type backlight module is cold cathode fluorescernt lamp (CCFL) or light emitting diode (LED). The CCFL has properties like high brightness, high efficiency and long life, and has a cylinder-shaped configuration which is easily coupled with light reflection components to form laminal lighting device. Therefore the CCFL has become the mainstream light emergence component. However, CCFLs are often arranged in a row and disposed at a bottom of an LCD panel, thereby the images displayed on the LCD are asymmetric in light intensity distribution because the diffusion angles of the scattered lights are usually too large, and the light emergence directions are usually disordered. Thus obvious profiles of the CCFLs are shown on the screen, which damage the quality of the images. Therefore, under the circumstance of direct type backlight module being applied, the larger of the dimension of the LCD panel and the greater of the number of the CCFLs are used, the more serious of the deficiency of black and white stripes shown on the screen occurs. The above mentioned problem is a main bottle-neck in the way of the development of the LCD display quality.

To solve the above mentioned problem, diffusion components and prisms are disposed between the CCFLs and the LCD panel to diffuse and then converge the lights. Therefore the lights emitted by the CCFLs are diffused, and then the diffusion angle is reduced for being efficiently coupled with the LCD panel, thereby homogeneously distributing the lights. However, the above design applies so many optical components as to not easy to be manufactured, and sharply increase the costs. Furthermore, the effect of homogeneously distributing the lights of the design is finite, and not the best solution to solve the problem.

Figure 6:
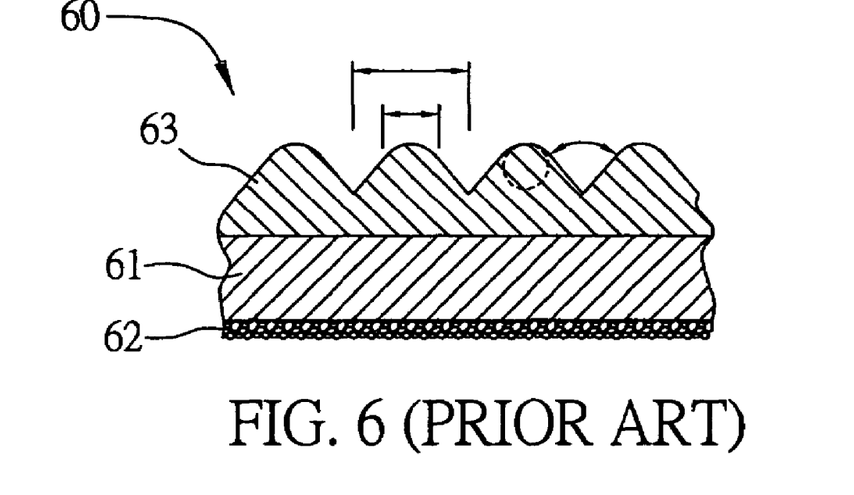
FIG. 6 is a schematic view of a conventional multi-layer brightness enhancement article disclosed in U.S. Pat. No. 6,280,063.

Referring to FIG. 6, U.S. Pat. No. 6,280,063 discloses a multi-layer brightness enhancement article 60 for enhancing the on-axis luminance of a diffuse lighting device. The brightness enhancement article 60 comprises a base layer 61, a separate layer 62 plated on the a bottom of the base layer 61, and a microstructure layer 63 arranged on a side of the base layer 61 opposite to the separate layer 62. The separate layer 62 is used for diffusing the lights. The microstructure layer 63 is used for converging the diffused lights. By using the separate layer 62 and the microstructure layer 63, the lights are homogeneously distributing. However, different processes are required in this invention for respectively forming the separate layer 62 and the microstructure layer 63, thereby increasing the manufacture costs. Furthermore, the processes are complicated and not suitable for mass production, and the effect of homogeneously distributing the lights can not satisfy the images quality requirements of consumers.

Figure 7:
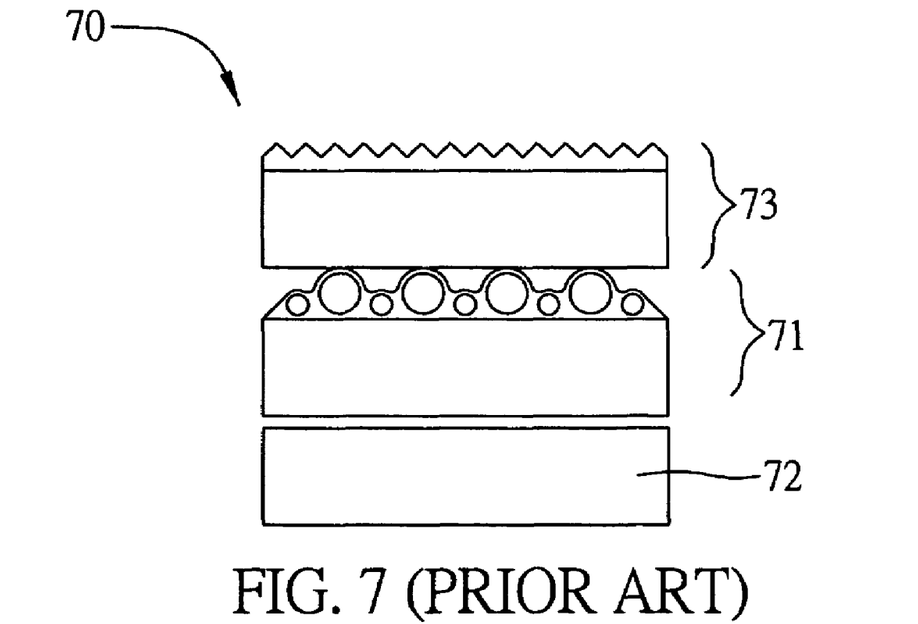
FIG. 7 is a schematic view of a conventional backlight module structure disclosed in US Pub. No. 20020001055.

Referring to FIG. 7, US Pub. No. 20020001055 discloses a backlight module structure 70, which applies resin particles to form a light diffusion layer 71. The light diffusion layer 71 diffuses the lights emitted by a backlight source 72 with wide-angle. A prism sheet 73 then converges the lights to achieve an effect of homogeneous diffusion. However, the backlight module structure 70 comprises so many components that leads to a complicated manufacture process and increases the manufacture costs. Furthermore, the homogeneous diffusion effect and the efficiency of the light utilization can not satisfy the market demands.

Additionally, conventional method also increases the number and the arrangement density of the CCFLs to solve the problems of unhomogeneously distributing the lights and of the profiles of the CCFLs being shown on the screen. However, the method greatly increases the manufacture costs. Furthermore, because of the configure limitation, if any one of the CCFLs failures, the whole row of CCFLs will be replaced with a new one. Under the circumstance of the number of the CCFLs being increased, the chance and frequency of CCFL failure and replace are correspondingly increased. Thus the service life of the whole LCD panel is shortened.

Thus an improved apparatus applied in the direct type backlight module for homogeneously distributing the lights, efficiently utilizing the light source, greatly lowering the manufacture costs and meeting the demands of the market is desired.

SUMMARY OF THE INVENTION

The primary objective of the present invention is to provide an apparatus for homogeneously distributing lights, which efficiently controls the light emergence direction and homogeneously distributing the lights.

Another objective of the present invention is to provide an apparatus for homogeneously distributing lights, which improves the light source utilization ratio.

A further objective of the present invention is to provide an apparatus for homogeneously distributing lights, which applies fewer optical films, and cuts down the manufacture costs.

And yet another objective of the present invention is to provide an apparatus for homogeneously distributing lights, which is suitable for mass production.

In accordance with the above and other objectives, the present invention proposes an apparatus for homogeneously distributing lights. The apparatus includes a light guide plate, an incidence microstructure and an emergence microstructure. The incidence microstructure is arranged on a surface of the light guide plate and opposite to a light source. The emergence microstructure is arranged on a surface of the light guide plate opposite to the incidence microstructure. The lights emitted by the light source pass through said apparatus thereby being homogenously distributed.

The apparatus can be applied to a backlight module of a liquid crystal display (LCD) panel. The incidence microstructure and emergence microstructure are manufactured by ultra-precision machining or micro-electro-mechanical system (MEMS). The incidence microstructure or emergence microstructure is one of the continuous and discontinuous honeycombed, circular, irregular or circular dot structure, or of a micro lens array structure, or any one of said structure incorporating a plurality of micro particles. The guide light plate having a refractive index greater than the outside environment is made of a light transmitting polymer material and semi light transmitting polymer material. The light source is a plurality of parallel cold cathode fluorescernt lamps (CCFLs).

The emergence microstructure of the emergence surface is designed for damaging total reflection of the lights in the light guide plate, thereby the lights experienced at least one time total reflection pass through the emergence surface where does not correspond to the light source, and emit to the outside environment environment. Thus the directions of the lights passing through the incidence microstructure of the incidence surface are changed, accordingly, the lights are homogeneously distributed, and further the light source utilization ratio is increased.

BRIEF DESCRIPTION OF THE DRAWINGS

The drawings included herein provide a further understanding of the invention. A brief description of the drawings is as follows.

DETAILED DESCRIPTION OF THE PREFERRED EMBODIMENT

Embodiments of an apparatus for homogeneously distributing lights 1 (this is referred to simply as "apparatus") of the present invention will now be explained in detail with reference to the drawings.

Figure 1A:
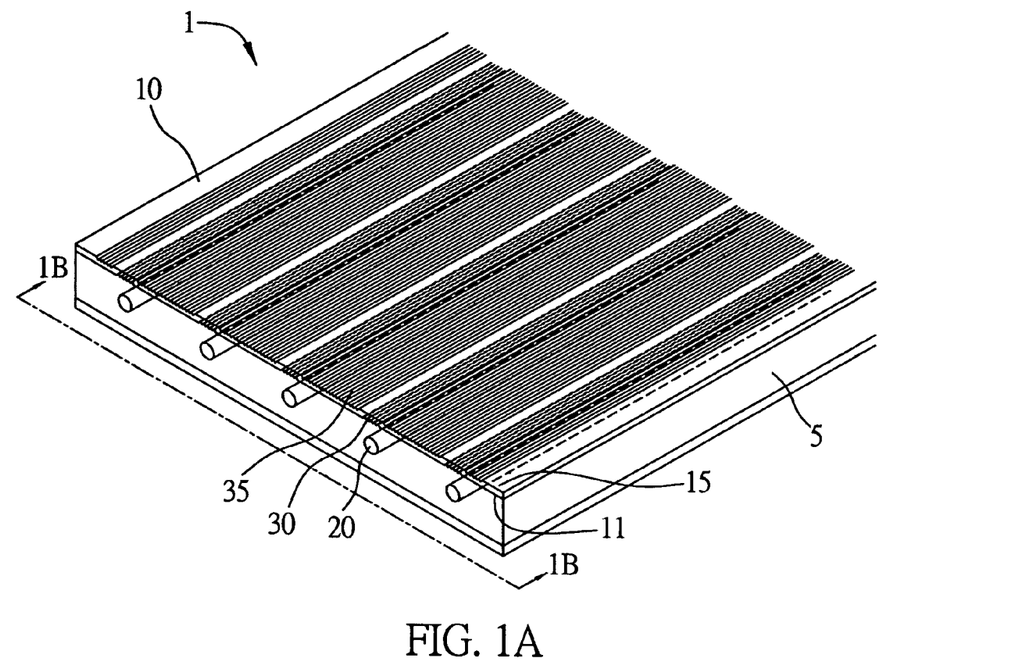
FIGS. 1A and 1B are schematic views of an apparatus for homogeneously distributing lights applied in a backlight module in accordance with a preferred embodiment of the present invention.
Figure 1B:
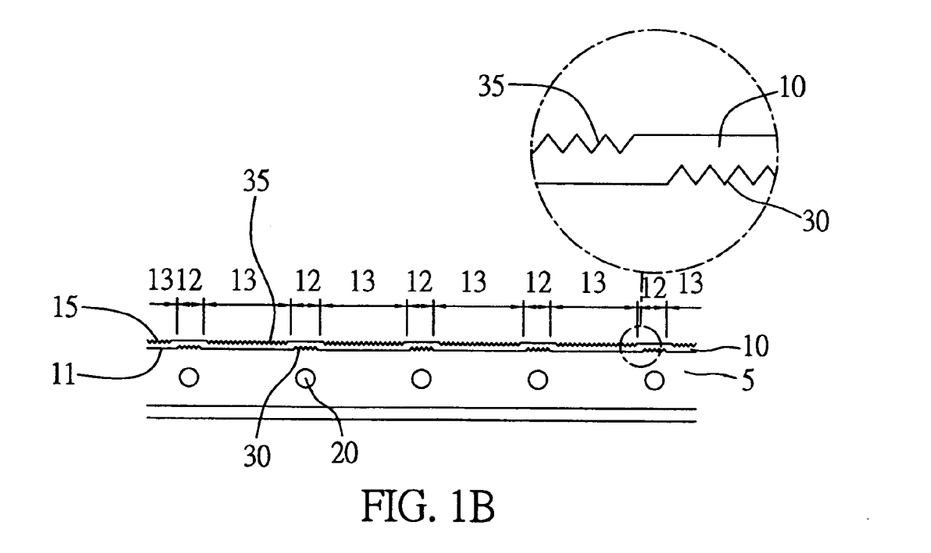

Referring to FIGS. 1A and 1B, schematic views of the apparatus 1 applied in a backlight module in accordance with a preferred embodiment of the present invention are shown, wherein the FIG. 1B is a side view of the FIG. 1A. The apparatus 1 is disposed on a surface of a main body of a backlight module 5. The backlight module 5 comprises a plurality of parallel cold cathode fluorescernt lamps (CCFLs) 20. The apparatus 1 comprises a light guide plate 10. The light guide plate 10 comprises an incidence surface 11 and an emergence surface 15. The incidence surface 11 is arranged opposite to the CCFLs 20. Lights emitted by the CCFLs 20 subsequently pass through the incidence surface 11, the main body of the light guide plate 10 and the emergence surface 15, and then emit to an adjacent liquid crystal display (LCD) panel (not shown) for displaying images.

The incidence surface 11 and the emergence surface 15 respectively define a plurality of interlaced first areas 12 and second areas 13. The first areas 12 of the incidence surface 11 and the emergence surface 15 correspond to the CCFLs 20. The second areas 13 of the incidence surface 11 and the emergence surface 15 correspond to the spaces sandwiched between the CCFLs 20. Each first area 12 defines an incidence microstructure 30. Each second area 13 defines an emergence microstructure 35. When the lights emitted by the CCFLs 20 pass through the incidence microstructure 30 and enter the light guide plate 10, the lights are scattered with wide-angle, thereby occurring total reflection in the light guide plate 10. After at least one time total reflection in the light guide plate 10, the lights emit to the outside environment through the emergence microstructures 35. That is, by applying the incidence microstructures 30 and the emergence microstructures 35, the lights emitted by the CCFLs 20 are not only emitted through the first areas 12 of the emergence surface 15, but also through the second areas 13 of the emergence surface 15 to the outside environment. Thus the lights generates by the CCFLs 20 are homogeneously distributed.

More specifically, the light guide plate 10 is made of transparent polymer material having a low light absorbency, or of light transmitting polymer material, or alternately of semi light transmitting polymer material. Said materials have a refractive index greater than that of the outside environment (such as the air) where the CCFLs 20 are located, thereby increasing the chance for occurring total reflection inside the light guide plate 10. The thickness of the light guide plate 10 (i.e. the distance from the incidence surface 11 to the emergence surface 15) can be adjusted according to the requirement and design. In a backlight module, the thickness of the light guide plate 10 is usually in a millimeter (mm) scale. The incidence microstructures 30 and the emergence microstructures 35 are manufactured by ultra-precision machining or micro-electro-mechanical system (MEMS). In the present embodiment, the section view of the incidence microstructure 30 or the emergence microstructure 35 is a longitudinally arranged continuous zigzag structure having a triangle section along the CCFLs 20. The configuration of the incidence microstructure 30 or the emergence microstructure 35 can be designed as a circular structure, a circular dot structure, or an irregular structure; or the angle, height, arrangement density or the like thereof can be various according to different specifications or requirements; or a plurality of micro particles can be mixed therein. Therefore, the passages of the lights are changed for improving the total reflection condition of the light guide plate 10. Chance for occurring total reflection is increased because the incidence angles of the lights entering into the light guide plate 10 through the incidence microstructure 30 are more likely greater than the corresponding critical angle. Consequently, by properly choosing the material and the refractive index of the light guide plate 10, and the location and configuration of the incidence microstructures 30, the probability for the incidence lights occurring total reflection is greatly increased. Furthermore, by properly choosing the location and configuration of the emergence microstructures 35, the probability for the lights entering into outside environment through the second areas 13 of the emergence surface 15 is greatly increased.

Figure 2:
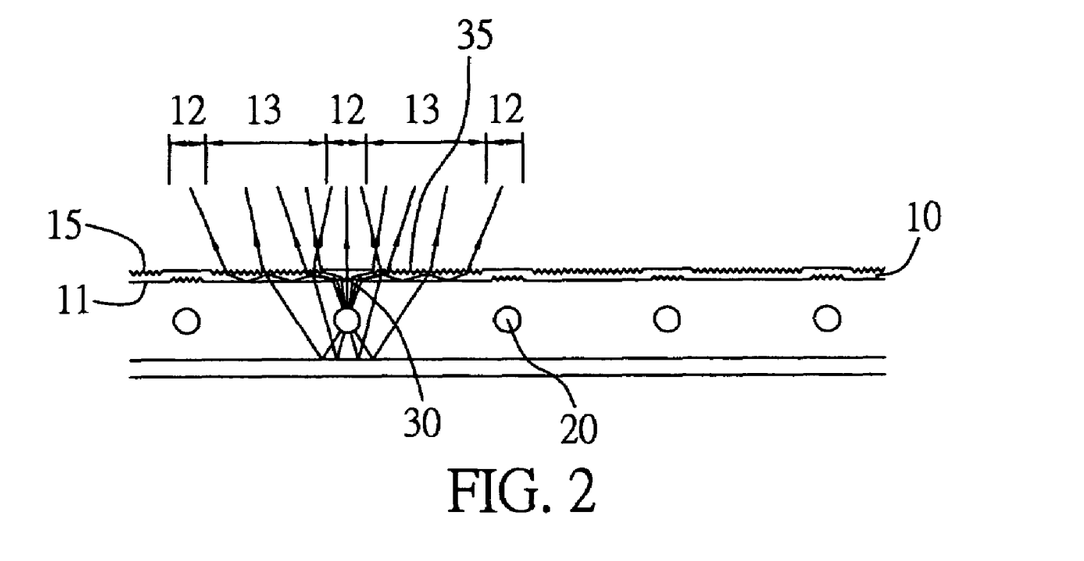
FIG. 2 is a schematic view of light passages of the apparatus of FIGS. 1A and 1B.

Referring to FIG. 2, passages of the lights emitted by the CCFLs 20 are further illustrated (illustrated with the lights emitted from only one CCFL). The lights pass through the incidence microstructure 30 of the first area 12 of the incidence surface 11, and enter into the light guide plate 10. Part of the lights occur total reflection in the light guide plate 10, and transmit along the light guide plate 10. Said lights occurring total reflection then pass through the emergence microstructure 35 which breaches the total reflection condition of the light guide plate 10, and then emitted to the outside environment through the second area 13 of the emergence surface 15. Therefore, the lights emitted from the first area 12 of the emergence surface 15 are greatly decreased, and the lights emitted from the second area 13 of the emergence surface 15 are correspondingly greatly increased. Thus the lights emitted from the whole light guide plate 10 are homogeneously distributed, the deficiency of profiles of the CCFLs 20 shown on the LCD screen of prior arts is eliminated.

Figure 3A:
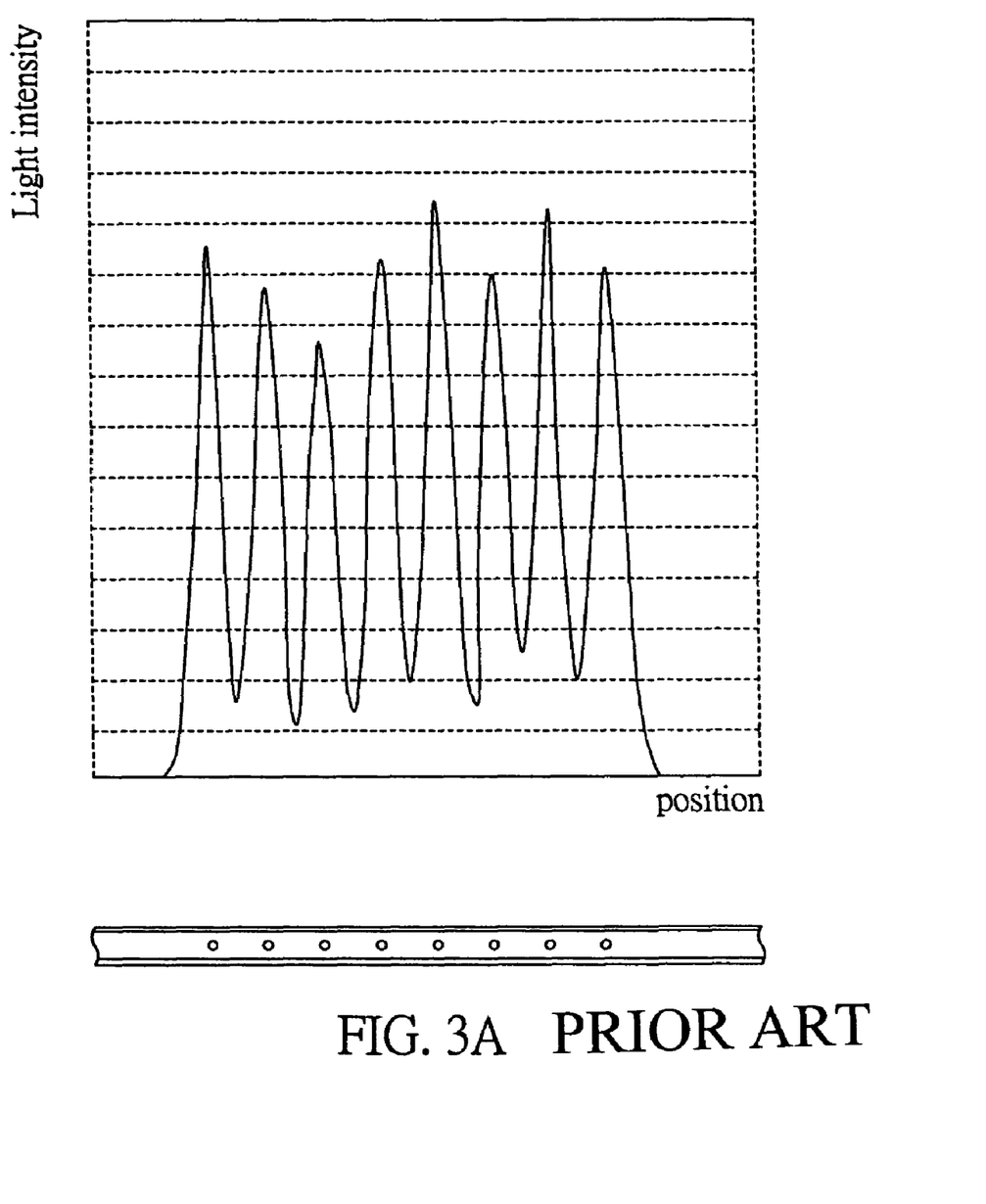
FIG. 3A is a light intensity distribution chart of a conventional backlight module.
Figure 3B:
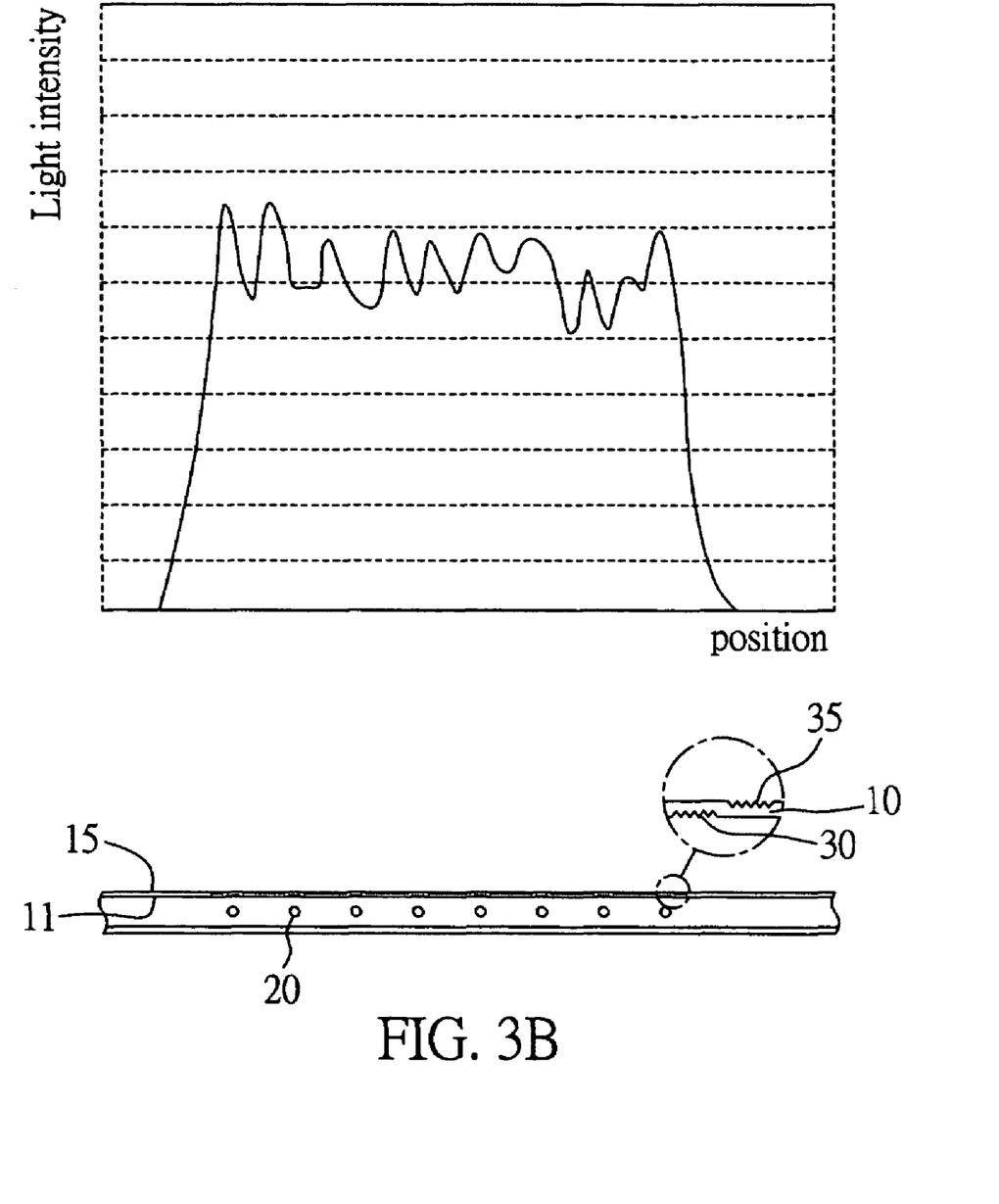
FIG. 3B is a light intensity distribution chart of the backlight module applying the apparatus of FIG. 1A and/or FIG. 1B.

Referring to FIG. 3A, a light intensity distribution chart of the CCFLs of conventional backlight module is illustrated. As can be seen, the light intensity is unhomogeneously distributed. Referring to FIG. 3B, a light intensity distribution chart of the CCFLs of present invention is illustrated. As can be seen, compared with FIG. 3A, the light intensity is substantially homogeneously distributed. By applying the incidence microstructures 30 and the emergence microstructures 35 to the light guide plate 10, the light energy density emitted through the first areas 12 of the emergence surface 15 is greatly decreased, and correspondingly, the light energy density emitted through the second areas 13 of the emergence surface 15 is greatly increased, thereby forming the light intensity distribution shown in FIG. 3B. The apparatus 1 of the present invention is thus homogeneously distributing the lights, simultaneously, the light source utilization ratio is increased, the manufacture processes are simplified, and the manufacture costs are lowered.

The foregoing detail description is only a preferred embodiment of the present invention, in which, the incidence microstructures 30 and emergence microstructures 35 are designed as a continuous shape. However, other structures which can achieve an effect of light diffusion or light total reflection also can be applied to the present invention, the best dimension and designed configuration of the structure can be various in accordance with the specification of the backlight module and the LCD panel, or of the distance from the plurality of CCFLs 20 to the light guide plate 10. Additionally, the feature of the present invention is that the first areas 12 of the incidence surface 11 of the light guide 10 define the incidence microstructures 30 for occurring total reflection, whether or not the emergence microstructures 35 are defined in the emergence surface 15 does not enormously influence the effect of lights homogeneously distributed. Besides the embodiments disclosed above, other embodiments, such as the emergence surface 15 defines the emergence microstructures 35 in all the areas thereof, or the emergence surface 15 does not define the emergence microstructures 35 therein, can also be applied in the present invention.

Figure 4:
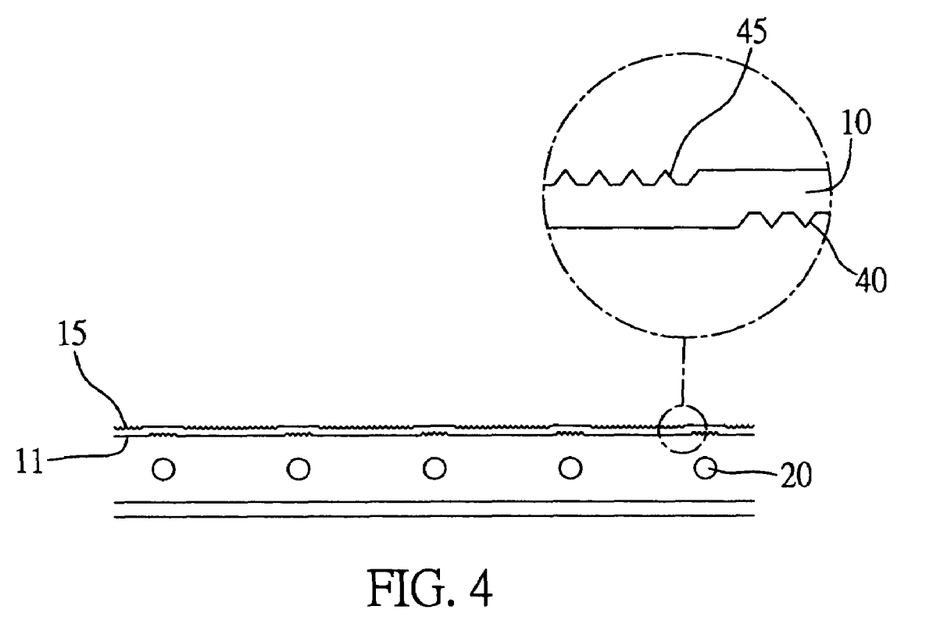
FIG. 4 is an alternative embodiment of the apparatus for homogeneously distributing lights of the present invention.
Figure 5:
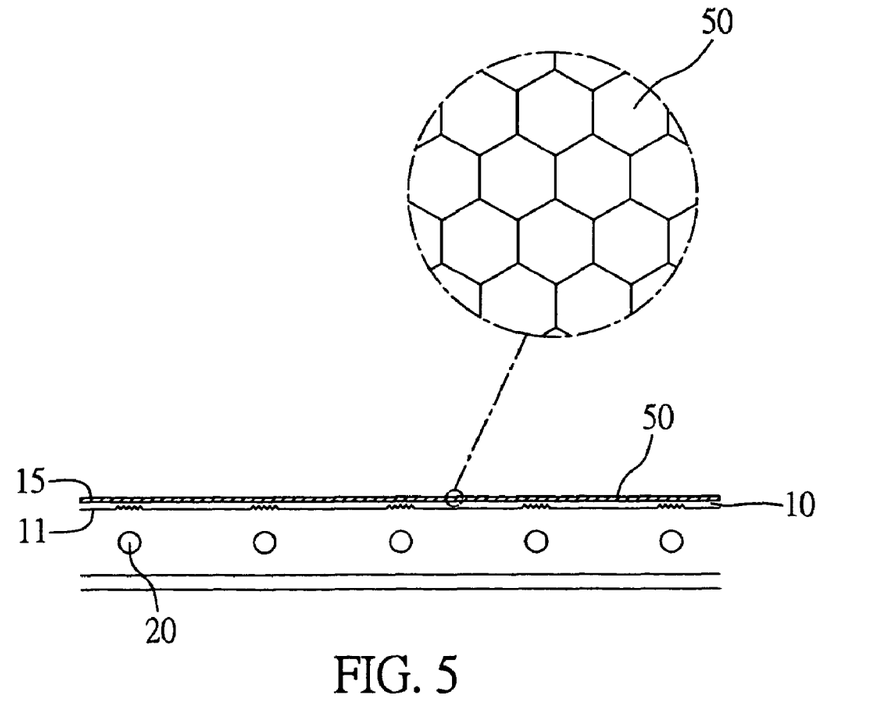
FIG. 5 is still an alternative embodiment of the apparatus for homogeneously distributing lights of the present invention.

Referring to FIG. 4, an alternate embodiment of an incidence microstructure 40 (corresponding to the incidence microstructure 30) and an emergence microstructure 45 (corresponding to the emergence microstructure 35) of the present invention is illustrated. The incidence microstructure 40 and emergence microstructure 45 are designed as discontinuous microstructures, and defined in the first areas 12 of the incidence surface 11 and the second areas 13 of the emergence surface 15 by MEMS. The incidence microstructure 40 or emergence microstructure 45 comprises a plurality of evenly spaced teeth for changing the critical angle of total reflection of the lights entering the light guide plate 10, and further for homogeneously distributing the lights. FIG. 5 illustrates another alternate embodiment of an emergence microstructure 50 of the present invention. The emergence microstructure 50 is an uninterrupted micro lens array which is arranged on the emergence surface 15 for changing the condition of total reflection of the lights entering the light guide plate 10, and further for homogeneously distributing the lights. The emergence microstructure 50 can be shaped as one of the honeycombed structure, circular dot structure and irregular structure, or any one of said structure incorporating micro particles.

The above embodiments of the apparatus 1 are described as being applied to a direct type backlight module, whereas the apparatus 1 can also be applied to other device whose lights emitted from a light source need to be guided or distributed to other structures. Furthermore, the light source of the present invention is not limited as the CCFLs 20, but can be any type of light source whose lights directions can be controlled by various incidence microstructures or emergence microstructures.

Conclusively, the apparatus 1 of the present invention can homogeneously distribute lights, improve light source utilization ratio; reduce the usage of optical films, lower the manufacture costs and be applied to mass production.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An apparatus for homogeneously distributing lights, comprising
    a single-layered light guide plate comprising an incidence surface and an emergence surface each of which defines a plurality of interlaced first areas and second areas, wherein each of the first areas is smaller than any of the second areas;
    an incidence microstructure being arranged on the first areas of the incidence surface of the light guide plate and directly in front of and opposite to a light source; and
    an emergence microstructure, the emergence microstructure being arranged on the second areas of the emergence surface of the light guide plate opposite to the incidence microstructure;
    wherein light emitted by the light source passes through said apparatus thereby being homogeneously distributed.

2. The apparatus as claimed in claim 1, wherein the incidence microstructure is a continuous structure or a discontinuous structure having a triangle cross-section and longitudinally arranged along the light source.

3. The apparatus as claimed in claim 1, wherein the emergence microstructure is a continuous structure or a discontinuous structure having a triangle cross-section and longitudinally arranged along the light source.

4. The apparatus as claimed in claim 1, wherein the emergence microstructure is a micro lens array structure.

5. The apparatus as claimed in claim 4, wherein the micro lens array structure is a structure selected from the groups consisting of honeycombed structure, circular dot structure and irregular structure.

6. The apparatus as claimed in claim 1, wherein the light source is a plurality of lamp.

7. The apparatus as claimed in claim 1, wherein the light guide plate is made of one of a light transmitting polymer material and a semi light transmitting polymer material.

8. The apparatus as claimed in claim 1, wherein the apparatus is applied to a backlight module of an LCD panel.

9. The apparatus as claimed in claim 1, wherein the incidence microstructure is comprised of a plurality of straight grooves.

10. The apparatus as claimed in claim 9, wherein the emergence microstructure is comprised of a plurality of straight grooves.

11. The apparatus as claimed in claim 1, wherein the emergence microstructure is comprised of a plurality of straight grooves.

* * * * *